US011249272B2

(12) United States Patent
Sato et al.

(10) Patent No.: US 11,249,272 B2
(45) Date of Patent: Feb. 15, 2022

(54) OPTICAL FIBER CABLE AND MANUFACTURING METHOD OF OPTICAL FIBER CABLE

(71) Applicant: SUMITOMO ELECTRIC INDUSTRIES, LTD., Osaka (JP)

(72) Inventors: Fumiaki Sato, Osaka (JP); Kuushin Ryan, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/768,191

(22) PCT Filed: Jan. 9, 2019

(86) PCT No.: PCT/JP2019/000269
§ 371 (c)(1),
(2) Date: May 29, 2020

(87) PCT Pub. No.: WO2019/139018
PCT Pub. Date: Jul. 18, 2019

(65) Prior Publication Data
US 2021/0181442 A1    Jun. 17, 2021

(30) Foreign Application Priority Data
Jan. 10, 2018  (JP) .............................. JP2018-001926

(51) Int. Cl.
*G02B 6/44*    (2006.01)
(52) U.S. Cl.
CPC .................................. *G02B 6/448* (2013.01)

(58) Field of Classification Search
CPC ...................................................... G02B 6/448
USPC ........................................................... 385/114
See application file for complete search history.

(56) References Cited

U.S. PATENT DOCUMENTS

| | | | |
|---|---|---|---|
| 2003/0091307 A1 | 5/2003 | Hurley et al. | |
| 2004/0001678 A1* | 1/2004 | Chiasson | G02B 6/4482 385/114 |
| 2010/0254668 A1 | 10/2010 | Consonni et al. | |
| 2015/0049997 A1* | 2/2015 | Isaji | G02B 6/4495 385/114 |
| 2015/0293325 A1* | 10/2015 | Kasahara | G02B 6/02395 385/114 |
| 2018/0039035 A1* | 2/2018 | Chiasson | G02B 6/4403 |

FOREIGN PATENT DOCUMENTS

| | | |
|---|---|---|
| JP | 2006-520020 A | 8/2006 |
| JP | 2011-169939 A | 9/2011 |
| JP | 2012-088454 A | 5/2012 |
| JP | 2013-088549 A | 5/2013 |
| JP | 2013-097320 A | 5/2013 |

(Continued)

*Primary Examiner* — Jerry M Blevins
(74) *Attorney, Agent, or Firm* — Faegre Drinker Biddle & Reath LLP

(57) ABSTRACT

An optical fiber cable includes: a plurality of ribs formed along a longitudinal direction of a cable; and a slot core in which a slot grove for housing an optical fiber ribbon is formed between the ribs. In the slot groove, a plurality of optical fiber ribbons are bundled and a plurality of subunits whose periphery is wound with a bundle material are provided, and the bundle materials between the plurality of subunits are bonded to each other.

5 Claims, 3 Drawing Sheets

(56) References Cited

FOREIGN PATENT DOCUMENTS

| JP | 2013-190641 | A | 9/2013 |
| JP | 2014-006472 | A | 1/2014 |
| JP | 2015-215447 | A | 12/2015 |
| WO | WO-2004-081611 | A2 | 9/2004 |

* cited by examiner

OPTICAL FIBER CABLE AND MANUFACTURING METHOD OF OPTICAL FIBER CABLE

TECHNICAL FIELD

The present disclosure relates to an optical fiber cable and a manufacturing method of the optical fiber cable.

The present application claims the benefit of priority of Japanese Patent Application No. 2018-001926, filed on Jan. 10, 2018, the content of which is incorporated herein by reference.

BACKGROUND ART

Patent Literature 1 describes an optical fiber unit formed by bundling an assembly of an optical fiber and by directly winding a plurality of bundle materials in a spiral shape in a longitudinal direction, in which the bundle materials are bonded to each other at a part or all of the intersections where any two pieces of the plurality of bundle materials intersect each other.

Patent Literature 2 describes an optical fiber unit including a plurality of optical fibers and a pair of bundle materials spirally wound around the outer periphery of the plurality of optical fibers in opposite directions to each other. Patent Literature 2 describes that a bonded portion where the bundle materials are bonded to each other is provided at the intersection of the pair of bundle materials, and a non-bonded portion where the bundle materials are not bonded to each other is formed between the bundle material and the optical fiber.

Patent Literature 3 describes a manufacturing method of an optical fiber unit, including: feeding out a plurality of identification threads; and heating and fusing the intersection of the identification threads so that the identification threads intersect each other.

Patent Literature 4 describes an optical fiber unit formed by bundling the periphery of a bundle of a plurality of optical fibers with at least two pieces of bundle materials, and the bundle materials are intermittently bonded to each other.

CITATION LIST

Patent Literature

Patent Literature 1: JP-A-2011-169939
Patent Literature 2: JP-A-2013-88549
Patent Literature 3: JP-A-2013-190641
Patent Literature 4: JP-A-2012-88454

SUMMARY OF INVENTION

An optical fiber cable according to one embodiment of the present disclosure includes: a slot core which has a plurality of ribs formed along a longitudinal direction of the optical fiber cable, and in which a slot grove for housing an optical fiber ribbon is formed between the ribs; and a plurality of subunits which are arranged in the slot groove, and each of which has a plurality of optical fiber ribbons which are bundled with a bundle material arranged around the optical fiber ribbons. In the optical fiber cable, the bundle materials between the plurality of subunits are bonded to each other.

A manufacturing method of an optical fiber cable according to one embodiment of the present disclosure includes: a process of generating a subunit by bundling a plurality of optical fiber ribbons and winding a bundle material therearound; a process of preparing a slot core which has a plurality of ribs formed along a longitudinal direction of the optical fiber cable, and in which a slot groove for housing the optical fiber ribbon is formed between the ribs, and housing the plurality of subunits in the slot groove; and a process of forming a cable jacket by extrusion molding in a state where the plurality of subunits are housed in the slot groove. The bundle materials between the plurality of subunits are heated and welded by using heat generated when the cable jacket is extrusion molded.

DESCRIPTION OF EMBODIMENTS

Technical Problem

Figure 1:
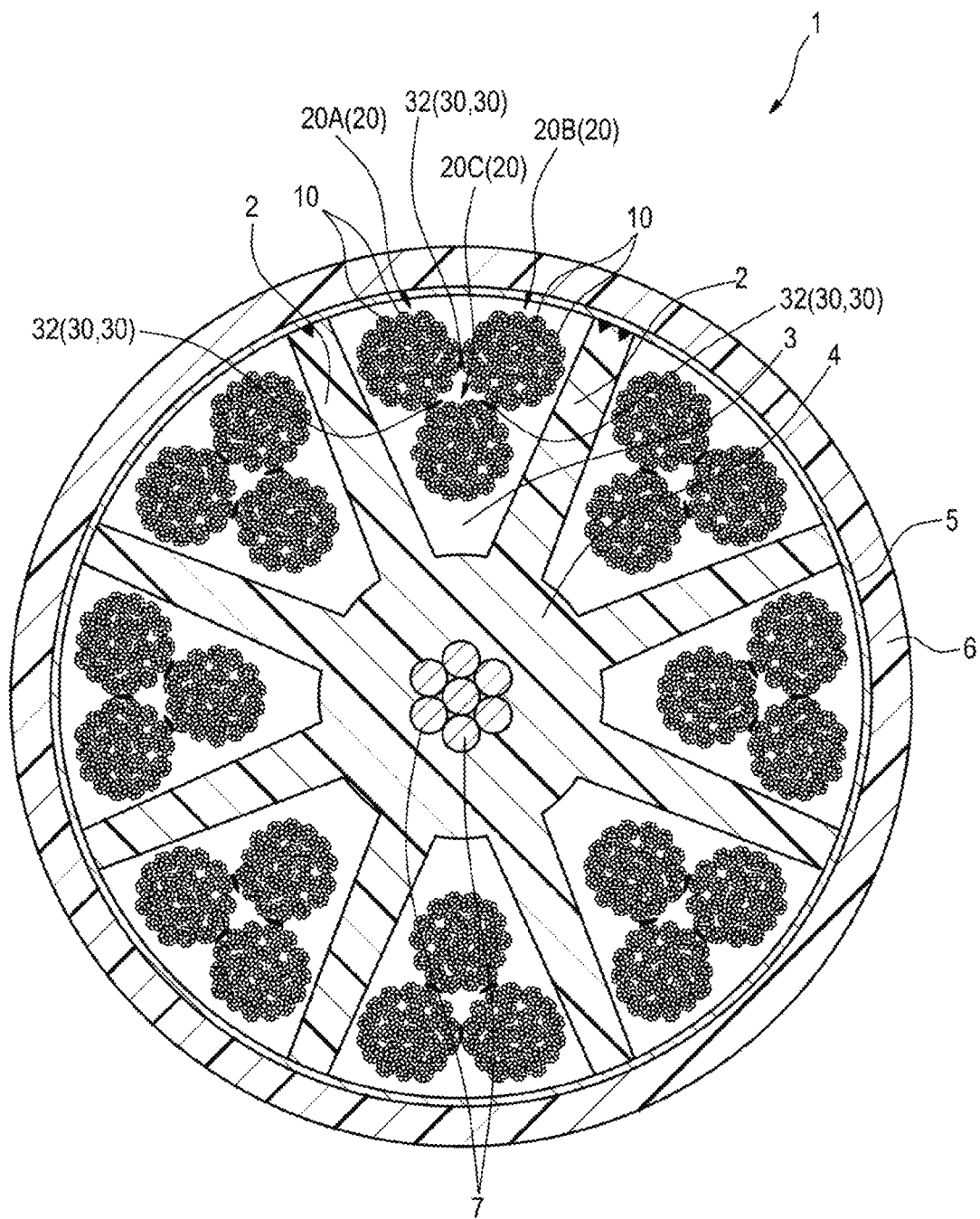
FIG. 1 is a cross-sectional view illustrating a configuration of an optical fiber cable according to an embodiment of the present disclosure.

In a tape slot type cable, since slot grooves for housing an optical fiber ribbon are different from each other, the optical fiber ribbons can be discriminated when taken out. Meanwhile, since a slot type cable in which the optical fiber ribbon is mounted with a multi-core high density has a small gap in the slot groove, it is difficult to take out the optical fiber ribbon from the slot groove when the cable is disassembled.

The slot type cable with multi-core high density has a large number of housed optical fiber ribbons, and after the optical fiber ribbon is taken out from the slot groove, discrimination is difficult since the optical fiber ribbon is mixed with an optical fiber ribbon taken out from another slot groove, and thus there is a possibility that the optical fiber ribbon is erroneously connected.

An object of the present disclosure is to provide an optical fiber cable in which a subunit formed by bundling a plurality of optical fiber ribbons is easily taken out from a slot groove, and discrimination between the subunits and between the optical fiber ribbons after being taken out therefrom is excellent, and a manufacturing method of the optical fiber cable.

Advantageous Effects of Disclosure

According to the present disclosure, it is possible to provide an optical fiber cable in which a subunit formed by bundling a plurality of optical fiber ribbons is easily taken out from a slot groove, and discrimination between the subunits and between the optical fiber ribbons after being taken out therefrom is excellent, and a manufacturing method of the optical fiber cable.

DESCRIPTION OF EMBODIMENTS OF PRESENT DISCLOSURE

First, embodiments of the present disclosure will be listed and described.

An optical fiber cable according to one embodiment of the present disclosure includes:

(1) a slot core which has a plurality of ribs formed along a longitudinal direction of the optical fiber cable, and in which a slot grove for housing an optical fiber ribbon is formed between the ribs; and a plurality of subunits which are arranged in the slot groove, and each of which has a plurality of optical fiber ribbons which are bundled with a bundle material arranged around the optical fiber ribbons. In the optical fiber cable, the bundle materials between the plurality of subunits are bonded to each other.

According to the above-described configuration, since the bundle materials between the plurality of subunits are bonded to each other, the optical fiber ribbon can be easily taken out collectively when being taken out from the cable. The subunits are integrated with each other for each slot groove from which the subunits are taken out. Accordingly, it is possible to provide an optical fiber cable in which the optical fiber ribbon is easily taken out from the slot groove, and discrimination between the subunits and between the optical fiber ribbons after being taken out therefrom is excellent.

(2) The optical fiber ribbon may be an intermittent connection type optical fiber ribbon in which a connection portion where adjacent optical fibers are connected to each other and a non-connection portion where the adjacent optical fibers are not connected to each other are intermittently provided in the longitudinal direction between some parts of the optical fibers or between all the optical fibers.

According to the above-described configuration, since the optical fiber ribbon is the intermittent connection type, the optical fiber ribbon can be housed in the optical fiber cable with high density.

(3) A lubricant may be applied to a surface layer of the optical fiber ribbon.

According to the above-described configuration, the optical fiber ribbon is hard to be bonded to the bundle material, and the bundle material is easily removed.

(4) One of the subunits may be wound by at least two pieces of the bundle materials, and the two pieces of bundle materials are bonded to each other, and bonding intensity between the bundle materials between the plurality of subunits may be lower than bonding intensity between the two pieces of bundle materials.

According to the above-described configuration, the subunits can be easily separated from each other after being taken out from the optical fiber cable.

(5) The bundle material may have a two-layer structure formed of an inner layer material and an outer layer material, the bundle materials between the plurality of subunits may contact each other in the outer layer materials, and a melting point of the inner layer material may be higher than a melting point of the outer layer material.

According to the above-described configuration, since the bundle materials between the plurality of subunits contact each other in the outer layer materials having a relatively low melting point, the bundle materials between the plurality of subunits can be easily welded to each other at a degree of heat generated when the cable jacket is extrusion molded.

A manufacturing method of an optical fiber cable according to one embodiment of the present disclosure includes:

(6) a process of generating a subunit by bundling a plurality of optical fiber ribbons and winding a bundle material therearound;

a process of preparing a slot core which has a plurality of ribs formed along a longitudinal direction of the optical fiber cable, and in which a slot groove for housing the optical fiber ribbon is formed between the ribs, and housing the plurality of subunits in the slot groove; and a process of forming a cable jacket by extrusion molding in a state where the plurality of subunits are housed in the slot groove.

The bundle materials between the plurality of subunits are heated and welded by using heat generated when the cable jacket is extrusion molded.

According to the above-described method, since the bundle materials between the plurality of subunits are heated and welded by using the heat generated when the cable jacket is extrusion molded, it is not required to separately perform a process of heating the bundle materials, thereby making it possible to simplify the manufacturing process.

Details of Embodiments of the Present Disclosure

A specific example of an optical fiber cable and a manufacturing method of the optical fiber cable according to an embodiment of the present disclosure will be described hereinafter with reference to the drawings.

The present invention is not limited to these examples, but is indicated by the claims, and is intended to include all the modifications within meanings equivalent to the scope of the claims, and the scope.

FIG. 1 is a cross-sectional view perpendicular to a length direction of the optical fiber cable according to the embodiment of the present disclosure. As illustrated in FIG. 1, an optical fiber cable 1 includes a slot core 4 including a plurality of (eight pieces in this example) ribs 2 and a slot groove 3 formed between the ribs 2. The rib 2 and the slot groove 3 are formed, for example, in a spiral or SZ shape along a longitudinal direction (the length direction) of the optical fiber cable 1. The slot core 4 is formed of, for example, a synthetic resin of polycarbonate (PC) and polybutylene terephthalate (PBT) or a hard resin such as high-density polyethylene (HDPE).

Figure 2:
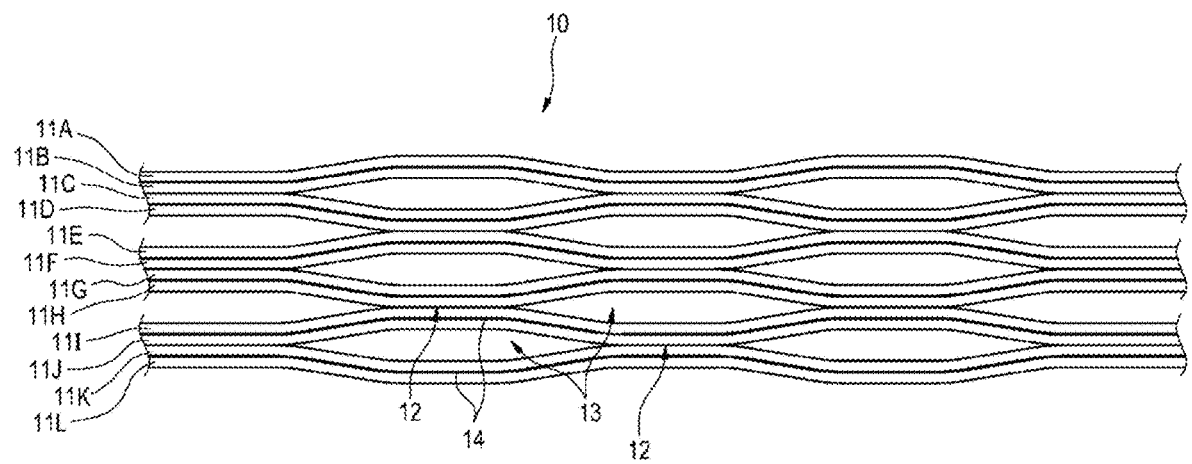
FIG. 2 is a diagram illustrating an example of an optical fiber ribbon housed in the optical fiber cable.
Figure 3:
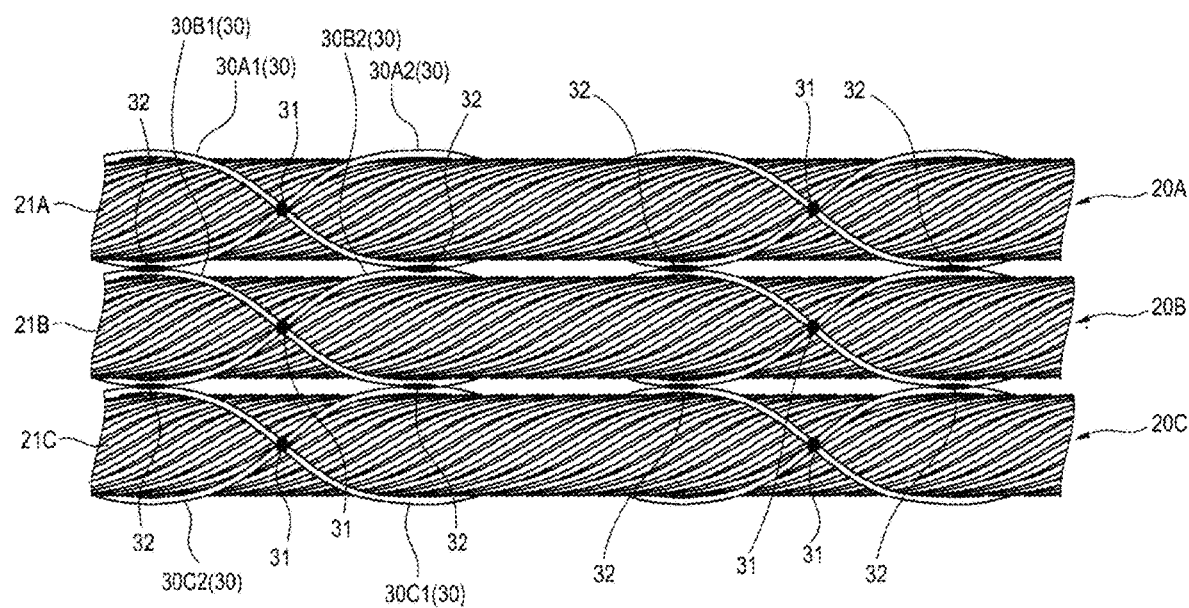
FIG. 3 is a diagram illustrating an example of a subunit housed in the optical fiber cable.

A plurality of subunits 20 are housed in the slot groove 3. In this example, three pieces of subunits 20 (20A to 20C) are housed in one slot groove 3. For example, the subunit 20 is formed by winding a bundle material 30 as illustrated in FIG. 3 around an assembly 21 in which, for example, a plurality of optical fiber ribbons 10 as illustrated in FIG. 2 are bundled. The bundled materials 30 respectively wound around are bonded to each other, whereby the respective subunits 20A to 20C are connected to each other via a bonded place 32. The optical fiber ribbon 10 will be described in detail with reference to FIG. 2. The subunits 20A to 20C will be described in detail in FIG. 3, and the bundle material 30 will be described in detail in FIGS. 3 and 4.

A water absorbing tape 5 is wound around the outer periphery of the slot core 4 by, for example, vertical attachment or horizontal winding so as to cover the slot groove 3. A jacket 6 is provided outside the water absorbing tape 5 so as to cover the periphery of the slot core 4 via the water absorbing tape 5. The jacket 6 is formed of, for example, a resin such as polyethylene (PE). The jacket 6 is formed around the slot core 4 by extrusion-molding a resin.

A tension member 7 formed of a steel wire is embedded in the center of the slot core 4 along the longitudinal direction of the optical fiber cable 1.

FIG. 2 illustrates an example of the optical fiber ribbon 10 forming the subunit 20. As illustrated in FIG. 2, the optical fiber ribbon 10 is an optical fiber ribbon of an intermittent connection type in which a connection portion 12 where the adjacent optical fibers are connected to each other and a non-connection portion 13 where the adjacent optical fibers are not connected to each other are intermittently provided in the longitudinal direction in a state where the plurality of optical fibers 11A to 11L are arranged in parallel. A surface layer of the optical fiber ribbon 10 is coated with, for example, a lubricant such as talc.

A place where the connection portion 12 and the non-connection portion 13 are intermittently provided may exist between some parts of the optical fibers as illustrated in FIG. 2 or may exist between all the optical fibers. In the example illustrated in FIG. 2, the non-connection portion 13 is not provided between respective lines of the optical fibers 11A and 11B, 11C and 11D, 11E and 11F, 11G and 11H, 11I and 11J, and 11K and 11L.

The connection portion 12 in the optical fiber ribbon 10 is formed by applying a connection resin 14 formed of, for example, an ultraviolet curable resin and a thermosetting resin between the optical fibers. The connection resin 14 is intermittently applied between the predetermined optical fibers, whereby the connection portion 12 and the non-connection portion 13 are intermittently provided, and the respective optical fibers 11A to 11L are integrated in a parallel state. The connection resin 14 may be applied to only one side of a parallel surface to be formed by the optical fibers 11A to 11L arranged in parallel, or may be applied to both sides thereof. The optical fiber ribbon 10 may be manufactured in such a manner that, for example, a tape resin is applied to one side or the whole of both sides of the optical fibers 11A to 11L arranged in parallel and all the optical fibers 11A to 11L are connected to each other, after which the non-connection portion 13 is formed by cutting a part with a rotary blade.

Each of the optical fibers 11A to 11L is formed with, for example, a glass fiber formed of a core and a clad, and a coating layer for covering the glass fiber. For example, the coating layers of the optical fibers 11A to 11L are colored in respectively different colors so that the optical fibers can be discriminated from each other.

FIG. 3 illustrates an example of the subunit 20 (20A to 20C) housed in the optical fiber cable 1. FIG. 3 illustrates a state in which the subunits 20A to 20C are arranged in parallel (for example, a state before being housed in the optical fiber cable 1). The subunit 20 includes the assembly 21 (21A to 21C) formed by bundling a plurality of optical fiber ribbons 10, and the bundle material 30 wound around the assembly 21.

In this example, the optical fiber ribbon 10 assembled as the assembly 21 is formed into an assembled form in which a plurality of optical fibers 11A to 11L are assembled (for example, assembled in a round shape) in a cross-sectional view so that a length in an arrangement direction is shorter than that of a case where the twelve pieces of optical fibers 11A to 11L are arranged in a line. The optical fiber ribbons 10 may be twisted, for example, in a spiral shape to form the assembly 21 or may be assembled without being twisted to form the assembly 21.

Two pieces of bundle materials 30 for bundling a plurality of twisted optical fiber ribbons 10 are wound around each of the assemblies 21A to 21C. For example, bundle materials 30A1 and 30A2 are wound around the assembly 21A, bundle materials 30B1 and 30B2 are wound around the assembly 21B, and bundle materials 30C1 and 30C2 are wound around the assembly 21C. The two pieces of bundle materials 30 in each of the assemblies 21A to 21C are wound in a spiral shape in the longitudinal direction of the assembly. The two pieces of bundle materials 30 are wound in opposite directions to each other, and intersect each other at a predetermined gap in the longitudinal direction of the assembly.

At a place (the intersection 31) where the two pieces of bundle materials 30 (30A1 and 30A2, 30B1 and 30B2, 30C1 and 30C2) wound around each assembly 21 intersect each other, the two pieces of bundle materials 30 are bonded to each other. The bundle materials 30 are bonded to each other by, for example, heat welding or an adhesive. The bundle material 30 is formed of, for example, a tape or a thread of polyethylene (PE), polypropylene (PP), and polyethylene terephthalate (PET).

As illustrated in FIG. 1 described above, in the embodiment, the subunits are connected to each other in such a manner that the bundle materials 30 between the adjacent subunits are bonded to each other at the bonded place 32.

In the state where the subunits 20A to 20C in FIG. 3 are arranged in parallel, a place between the subunits 20A and 20B is bonded at the bonded place 32 between the bundle materials 30A1 and 30B2 and the bonded place 32 between the bundle materials 30A2 and 30B1. A place between the subunits 20B and 20C is bonded at the bonded place 32 between the bundle materials 30B1 and 30C2 and the bonded place 32 between the bundle materials 30B2 and 30C1. As illustrated in FIG. 1, the subunits 20A to 20C are assembled, for example, in a round shape, and housed in the slot groove 3 of the optical fiber cable 1. In the state illustrated in FIG. 1, the bundle materials 30 are bonded to each other at the bonded place 32 between the subunits 20A and 20C.

The bonding between the bundle materials 30 between the subunits may be performed by, for example, welding by heating or bonding with the adhesive, and the bonding therebetween is performed at a bonding intensity lower than the bonding intensity of the two pieces of bundle materials 30 wound around each assembly 21. In the case of the welding by heating, the bundle materials 30 may be welded to each other by blowing hot air such as a hot jet or a dryer. When the jacket 6 is formed by extrusion molding, the heat of the jacket 6 to be extrusion-molded around the slot core 4 may be used as the heat for welding a contact point between the bundle materials 30.

Figure 4A:
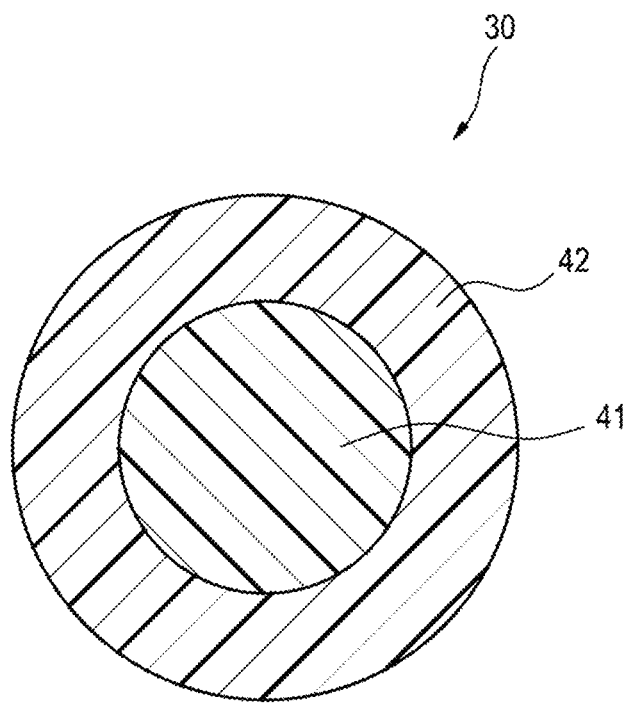
FIG. 4A is a cross-sectional view illustrating an example of a bundle material.
Figure 4B:
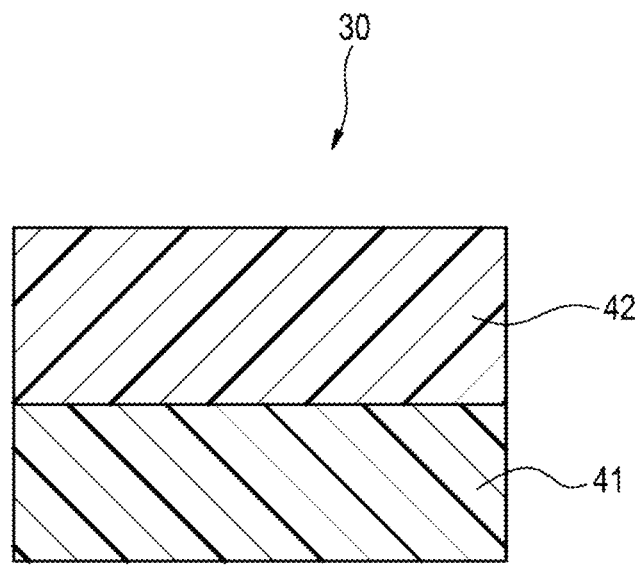
FIG. 4B is a cross-sectional view illustrating an example of a bundle material.

FIGS. 4A and 4B are cross-sectional views respectively illustrating an example of the bundle material 30.

As illustrated in FIG. 4A, the bundle material 30 has, for example, a coaxial two-layer structure formed of an inner layer material 41 and an outer layer material 42 provided around the inner layer material 41. A melting point of the inner layer material 41 is higher than a melting point of the outer layer material 42.

As the inner layer material 41, for example, PET can be used. As the outer layer material 42, for example, PE and PP can be used.

The melting point of the outer layer material 42 is, for example, 110° C. to 130° C. The melting point of the inner layer material 41 is, for example, equal to or higher than 230° C. A resin temperature of the jacket 6 when the extrusion molding is performed is about 160° C. to 200° C.

For example, as illustrated in FIG. 4B, the bundle material 30 may have a two-layer planar structure formed of the inner layer material 41 and the outer layer material 42 provided on the upper side of the inner layer material 41. A material and a melting point of the inner layer material 41 and the outer layer material 42 are the same as those of the bundle material illustrated in FIG. 4A.

When the bundle material 30 having the structure illustrated in FIG. 4A is wound around each assembly 21, the bundle materials are connected to each other by, for example, heating and welding the both layer materials of the outer layer material 42 and the inner layer material 41 at the intersection 31 of the two pieces of bundle materials 30 wound around each assembly 21. On the other hand, the bundle materials 30 between the adjacent subunits 20 are connected to each other by, for example, heat welding only of the outer layer material 42. Therefore, the bonding intensity of the bonded place 32 between the bundle materials 30 between the adjacent subunits 20 is lower than the bonding intensity between the bundle materials 30 at the intersection 31 of the bundle materials 30.

When the bundle material 30 having the structure illustrated in FIG. 4B is wound around each assembly 21, each bundle material 30 is wound in such a direction that the inner layer material 41 is opposite to an outer peripheral surface of the assembly 21. That is, the outer layer material 42 of each bundle material 30 is wound so as to face the outside of the subunit 20. Therefore, the inner layer material 41 of one bundle material 30 and the outer layer material 42 of the other bundle material 30 overlap each other in a state of being opposite to each other at the intersection 31 of the two pieces of bundle materials 30 wound around each assembly 21. The outer layer materials 42 of the respective bundle materials are bonded to each other in a state of being opposite to each other at the bonded place 32 between the bundle materials 30 between the adjacent subunits 20. The heat welding of the bundle material 30 at the intersection 31 and the bonding intensity of the bonded place 32 are the same as those of the bundle material 30 in FIG. 4A.

When the bundle materials are welded to each other by blowing the hot air to the subunit 20 housed in the slot groove 3, it is desirable to apply a lubricant (such as talc) to the inner wall of the slot groove 3 so that the bundle material 30 melted by the heat is not bonded to the inner wall thereof. The bundle material 30 may be formed to include a lubricant (such as silicone). The two pieces of bundle materials 30 are wound around each of the above-described subunits, and the number of the bundle materials 30 may be three or more, or may be singular.

According to the optical fiber cable 1 configured as described above, since the bundle materials 30 between the plurality of subunits 20 are bonded to each other, when the optical fiber ribbon 10 is taken out from the optical fiber cable 1, all the subunits 20 housed in each slot groove 3 can be taken out at once. Therefore, the optical fiber ribbon 10 can be easily taken out from the slot groove 3. Since a plurality of subunits 20 are integrated for each slot groove 3 from which the plurality of subunits 20 are taken out, the discrimination between the subunits 20 and between the optical fiber ribbons 10 after being taken out therefrom is excellent.

Since the optical fiber ribbon 10 is the intermittent connection type, the optical fiber ribbon 10 can be housed in the slot groove 3 with high density.

Since the lubricant is applied to the surface layer of the optical fiber ribbon 10, when the bundle material 30 is heated and welded or bonded with the adhesive, it is possible to make it difficult for the optical fiber ribbon 10 to be bonded to the bundle material 30. Since the lubricant is included in the inner wall of the slot groove 3 or the bundle material 30, it is possible to make it difficult for the bundle material 30 melted by heat to be bonded to the inner wall of the slot groove 3.

Since the bundle materials 30 between the plurality of subunits 20 contact each other in the outer layer materials 42 having a relatively low melting point, the bundle materials 30 between the plurality of subunits 20 can be easily welded by using the heat generated when the jacket 6 of the cable is extrusion-molded.

The bonding intensity of the bonded place 32 between the bundle materials 30 between the adjacent subunits 20 is lower than the bonding intensity of the bundle materials at the intersection 31 of the bundle materials 30. Therefore, it is possible to separate the bundle materials 30 between the adjacent subunits 20 while the bundle materials 30 at the intersection 31 are bonded to each other. Therefore, after being taken out from the optical fiber cable 1, the subunit 20 can be easily separated.

In the above-described embodiment, the optical fiber ribbon 10 is the intermittent connection type as described above, and may be in the form of a normal optical fiber ribbon in which all the optical fibers are connected to each other in the longitudinal direction.

Next, a manufacturing method of the optical fiber cable 1 will be described.

The assembly 21 is formed by bundling a plurality of optical fiber ribbons 10. The bundle material 30 is wound around the formed assembly 21, thereby manufacturing the subunit 20. The number of bundle materials 30 wound around each assembly 21 may be singular or plural. For example, when a plurality (two pieces) of the bundle materials 30 are wound therearound, the two pieces of bundle materials are wound therearound in a spiral shape in the opposite directions to each other, and the intersections 31 where the two bundle materials intersect each other are bonded.

The plurality of ribs 2 formed along the longitudinal direction of the cable are provided, and the slot core 4 in which the slot groove 3 for housing the optical fiber ribbon 10 is formed between the ribs is prepared. The plurality (three pieces in this example) of subunits 20A to 20C are assembled and housed in each slot groove 3 of the slot core 4. The water absorbing tape 5 is wound around the slot core 4 in which the subunits 20A to 20C are housed.

In a state where the subunits 20A to 20C are housed in the slot groove 3, the jacket 6 of the cable is formed by the extrusion molding. The bundle material 30 of the subunits 20A to 20C is heated by using heat generated when the jacket 6 is extrusion-molded, and the bundle materials 30 between the subunits are heated and welded to each other.

According to the manufacturing method of the optical fiber cable 1, since the bundle materials of the subunits 20A to 20C can be heated and welded to each other by using the heat generated when the jacket 6 of the cable is extrusion-molded, it is not required to separately provide a process of heating the bundle materials, thereby making it possible to simplify a manufacturing process.

Hereinabove, while the present disclosure is described in detail and with reference to specific embodiments, it is apparent to those skilled in the art that various changes and modifications can be made without departing from the spirit and scope of the present disclosure. The number, position, and shape of the components described above are not limited to the above-described embodiments, and can be changed to the number, position, and shape suitable for implementing the present disclosure.

REFERENCE SIGNS LIST

1: optical fiber cable
2: rib
3: slot groove
4: slot core

6: jacket
10: optical fiber ribbon
11A to 11L: optical fiber
12: connection portion
13: non-connection portion
20 (20A to 20C): subunit
21 (21A to 21C): assembly
30 (30A1, 30A2, 30B1, 30B2, 30C1, and 30C2): bundle material
31: intersection
32: bonded place
41: inner layer material
42: outer layer material

The invention claimed is:

1. An optical fiber cable, comprising:
a slot core which has a plurality of ribs formed along a longitudinal direction of the optical fiber cable, and in which a slot groove for housing an optical fiber ribbon is formed between the ribs; and
a plurality of subunits which are arranged in the slot groove, and each of which has a plurality of optical fiber ribbons which are bundled with a bundle material arranged around the optical fiber ribbons, wherein
the bundle materials between the plurality of subunits are bonded to each other,
one of the plurality of subunits is wound by at least two pieces of the bundle materials, and the two pieces of bundle materials are bonded to each other, and
bonding intensity between the bundle materials between the plurality of subunits is lower than bonding intensity between the two pieces of bundle materials.

2. The optical fiber cable according to claim 1, wherein the optical fiber ribbon is an intermittent connection type optical fiber ribbon in which a connection portion where adjacent optical fibers are connected to each other and a non-connection portion where the adjacent optical fibers are not connected to each other are intermittently provided in a longitudinal direction between some parts of the optical fibers or between all the optical fibers.

3. The optical fiber cable according to claim 1, wherein a lubricant is applied to a surface layer of the optical fiber ribbon.

4. An optical fiber cable comprising:
a slot core which has a plurality of ribs formed along a longitudinal direction of the optical fiber cable, and in which a slot groove for housing an optical fiber ribbon is formed between the ribs; and
a plurality of subunits which are arranged in the slot groove, and each of which has a plurality of optical fiber ribbons which are bundled with a bundle material arranged around the optical fiber ribbons, wherein
the bundle materials between the plurality of subunits are bonded to each other,
the bundle material has a two-layer structure formed of an inner layer material and an outer layer material,
the bundle materials between the plurality of subunits contact each other in the outer layer materials, and
a melting point of the inner layer material is higher than a melting point of the outer layer material.

5. A manufacturing method of an optical fiber cable, comprising:
a process of generating a subunit by bundling a plurality of optical fiber ribbons and winding a bundle material therearound;
a process of preparing a slot core which has a plurality of ribs formed along a longitudinal direction of the optical fiber cable, and in which a slot groove for housing the optical fiber ribbon is formed between the ribs, and housing the plurality of subunits in the slot groove; and
a process of forming a cable jacket by extrusion molding in a state where the plurality of subunits are housed in the slot groove, wherein
the bundle materials between the plurality of subunits are heated and welded by using heat generated when the cable jacket is extrusion molded.

* * * * *